United States Patent
Xue et al.

(10) Patent No.: US 7,778,225 B2
(45) Date of Patent: Aug. 17, 2010

(54) METHOD AND APPARATUS FOR DYNAMIC PACKET TRANSPORT IN CDMA2000 NETWORKS

(75) Inventors: Hao Ann Xue, Ottawa (CA); Kenneth J. Liang, Ottawa (CA); Muhammad Khaledul Islam, Ottawa (CA)

(73) Assignee: Research In Motion Limited, Waterloo (CA)

( * ) Notice: Subject to any disclaimer, the term of this patent is extended or adjusted under 35 U.S.C. 154(b) by 97 days.

(21) Appl. No.: 11/944,694

(22) Filed: Nov. 26, 2007

(65) Prior Publication Data

US 2008/0069140 A1 Mar. 20, 2008

Related U.S. Application Data

(63) Continuation of application No. 10/681,763, filed on Oct. 8, 2003, now Pat. No. 7,315,520.

(51) Int. Cl.
*H04B 7/216* (2006.01)
*H04Q 7/20* (2006.01)

(52) U.S. Cl. ............... 370/335; 370/437; 370/311; 455/452.1; 455/574

(58) Field of Classification Search ........... 370/329, 370/335, 342, 437, 441, 311; 455/450, 451, 455/452.1, 453, 466, 445, 574, 343.1
See application file for complete search history.

(56) References Cited

U.S. PATENT DOCUMENTS

| | | | |
|---|---|---|---|
| 6,347,091 B1 | 2/2002 | Vilander et al. | |
| 6,519,461 B1 | 2/2003 | Soderberg et al. | |
| 6,738,618 B1 | 5/2004 | Morales et al. | |
| 6,757,293 B1 | 6/2004 | Chuah et al. | |
| 6,819,945 B1 | 11/2004 | Chow et al. | |
| 6,952,411 B2 | 10/2005 | Sinnarajah et al. | |
| 7,047,001 B2 * | 5/2006 | Chen | 455/422.1 |
| 7,315,520 B2 * | 1/2008 | Xue et al. | 370/311 |
| 2002/0126641 A1 | 9/2002 | Bender | |
| 2002/0173327 A1 * | 11/2002 | Rosen et al. | 455/518 |
| 2004/0053619 A1 * | 3/2004 | Kim et al. | 455/445 |
| 2004/0100991 A1 * | 5/2004 | Samadi et al. | 370/473 |
| 2004/0136476 A1 * | 7/2004 | Rosen et al. | 375/340 |

FOREIGN PATENT DOCUMENTS

EP 1307009 5/2003

* cited by examiner

*Primary Examiner*—Nguyen Vo
(74) *Attorney, Agent, or Firm*—Moffat & Co.

(57) ABSTRACT

A method and apparatus for saving network resources in a CDMA2000 network, the method comprising the steps of receiving a data packet for a wireless data device at a base station controller in the CDMA2000 network; determining a frame transport capability of a forward common channel; checking whether the data packet falls within the frame transport capability; and if the data packet falls within the frame transport capability, encapsulating the data packet as a data burst message; and sending the data burst message over the forward common channel, wherein the sending step over the forward common channel precludes a dedicated data traffic channel being established for the data packet thereby saving network resources on the CDMA2000 network.

13 Claims, 4 Drawing Sheets

METHOD AND APPARATUS FOR DYNAMIC PACKET TRANSPORT IN CDMA2000 NETWORKS

CROSS-REFERENCE TO RELATED APPLICATIONS

This application is a continuation of pending Ser. No. 10/681,763 filed Oct. 8, 2003, the entire disclosure of which is hereby incorporated herein by reference.

FIELD OF THE DISCLOSURE

The present invention relates to a method and apparatus for sending reverse and forward link data from and to a mobile device, and more specifically for sending reverse and forward link data without establishing a dedicated data Traffic Channel.

BACKGROUND

Wireless data devices are well known in the art. These devices provide a user with the capability of utilizing data services such as e-mails, browsers, or short message services (SMS). These devices further allow the use of data services wirelessly and while mobile.

In current CDMA 2000 networks, data packets are always sent out on a dedicated data Traffic Channel. On power-up of the wireless device, this Traffic Channel is obtained by attempting to obtain a valid Internet protocol (IP) address from a network. The device does this by attempting to establish a dedicated data Traffic Channel and then a point-to-point protocol (PPP) session. Once the device is assigned a valid IP address, the device is allowed to send or receive Packet Data through the Internet routed by the public data serving node (PDSN).

If no Packet Data is sent or received by the wireless data device within a certain time period, the device or the network releases the dedicated Traffic Channel assigned to the device. The PPP session is still kept even after the Traffic Channel is released. At this point, the device goes into a dormant state and stays in this dormant state until a new data packet is sent or received. When a new data packet is sent or received, the device re-establishes the dedicated Traffic Channel in order to send or receive any new data packet.

Always sending and receiving Packet Data on dedicated data Traffic Channels is not efficient with regards to both network resources and battery life of the data device. Network resources are wasted by having a dedicated data Traffic Channel for each wireless device. If the wireless device only occasionally sends or receives Packet Data, a dedicated data Traffic Channel may need to be established and kept for each outgoing or incoming packet.

With regards to the battery life of the wireless data device, the establishment of a dedicated data Traffic Channel involves call processing messages exchanged between the device and the network. This costs the device battery life to establish the dedicated data Traffic Channel. Further, keeping a data Traffic Channel up also requires more transmission power, which also affects the battery life.

A further problem with current CDMA 2000 networks is that they do not support simultaneous voice and data services. A device is not allowed to send or receive data pockets when the device has already established dedicated voice Traffic Channel from its dormant state.

SUMMARY

The present invention seeks to overcome the deficiencies in the prior art by providing a method and apparatus for reverse and forward link dynamic packet transport without the establishment of a dedicated data Traffic Channel. Specifically, the present invention allows for the sending of data in the form of a Data Burst Message along either the reverse access channel or within a dedicated Traffic Channel, such as a voice traffic channel.

CDMA 2000 networks provide the frame transport capability of sending short packets on the reverse access channel. The capability of the reverse access channel is broadcast on the Paging Channel with the Access Primary messages. The wireless device can therefore send data packets on this reverse Access Channel within the maximum transport capabilities of this reverse Access Channel.

Alternately, a data packet can be encapsulated as a Data Burst Message within a dedicated Traffic Channel, such as the voice traffic channel. The capability of the voice Traffic Channel is known to the wireless device and, as long as the data packet is within the voice Traffic Channel maximum transport capability, it can be sent as a Data Burst Message.

Further, a forward link message can be forwarded as a Data Burst Message. When the PDSN receives a data packet, it checks the packet size. If the packet is small enough to transport on the forward common cannel (e.g. Page Channel), the PDSN sends the packet data in a Data Burst Message adding a header for the Data Burst as "Packet Data".

The present disclosure therefore provides a method for saving network resources in a CDMA2000 network, the method comprising the steps of: receiving a data packet for a wireless data device at a base station controller in the CDMA2000 network; determining a frame transport capability of a forward common channel; checking whether the data packet falls within said frame transport capability; and if said data packet falls within said frame transport capability, encapsulating said data packet as a data burst message; and sending said data burst message over said forward common channel, wherein said sending step over said forward common channel precludes a dedicated data traffic channel being established for said data packet thereby saving network resources on said CDMA2000 network.

The present disclosure further provides a packet data serving node adapted to save network resources in a CDMA2000 network, comprising: a communications subsystem adapted to receive a data packet; a processor adapted to: determine a frame transport capability of a forward common channel, check whether the data packet falls within said frame transport capability; and if said data packet falls within said frame transport capability, encapsulate said data packet as a data burst message; and send, utilizing said communications subsystem, said data burst message over said forward common channel, wherein the sending the data burst message over said forward common channel precludes a dedicated data traffic channel being established for said data packet thereby saving network resources on said CDMA2000 network.

The present disclosure still further provides a method for saving battery life on a wireless data device comprising the steps of: receiving a data burst message on a forward common channel, checking if a burst type of the data burst message is packet data; if the burst type is packet data, reforming a data packet from the data burst message; and passing the data packet to an application layer on the wireless device, wherein receiving the data packet over the forward common channel precludes establishment of a dedicated data traffic channel, thereby saving battery life on the wireless device.

The present disclosure yet further provides a wireless data device adapted to save battery life, comprising: a communications subsystem adapted to receive a data burst message on a forward common channel, a processor adapted to: check if a burst type of the data burst message is packet data; if the burst type is packet data, reform a data packet from the data burst message; and pass the data packet to an application layer on the wireless device, wherein receiving the data packet over the forward common channel precludes establishment of a dedicated data traffic channel, thereby saving battery life on the wireless device

BRIEF DESCRIPTION OF THE DRAWINGS

The present invention is best understood with reference to the drawings, in which.

DETAILED DESCRIPTION OF THE DRAWINGS

Figure 1:
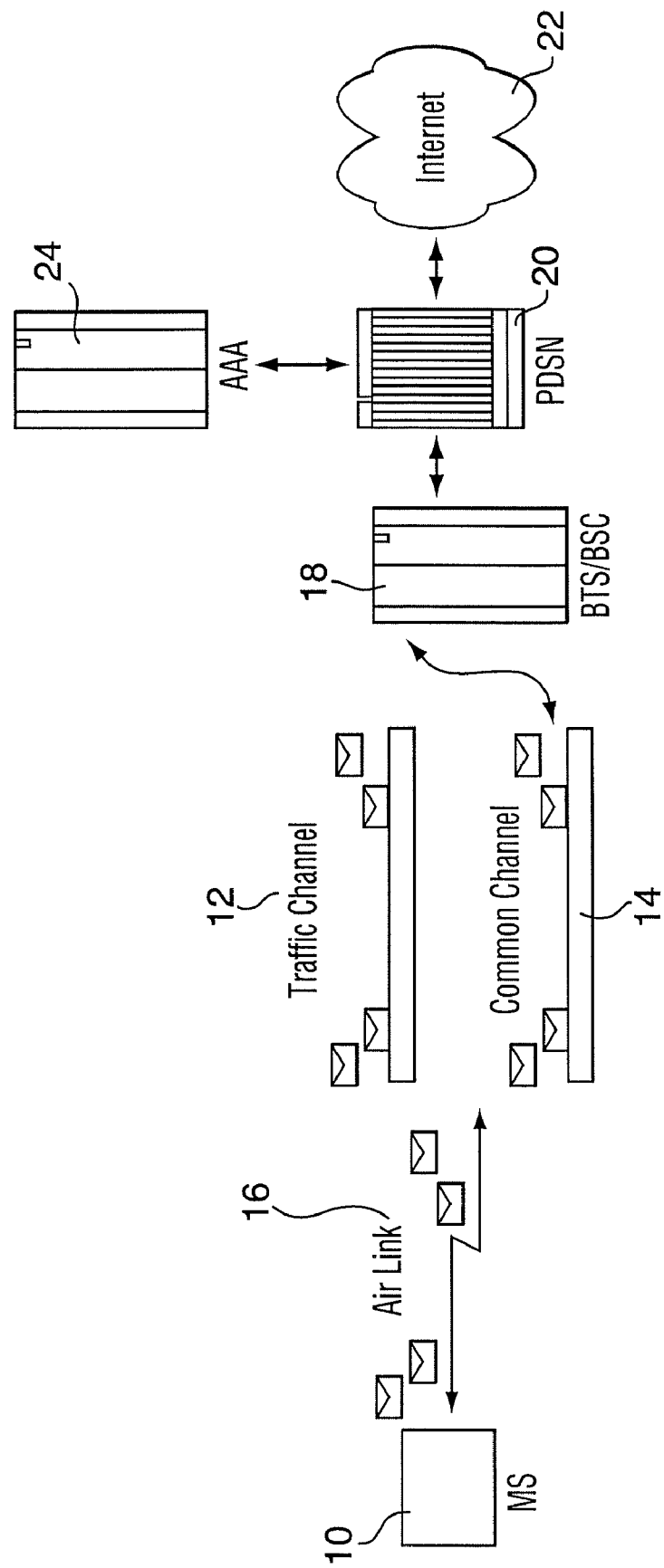
FIG. 1 is a schematic view of a wireless device within a CDMA 2000 network.

Reference is now made to FIG. 1. As illustrated, a wireless data device 10 is able to send or receive Packet Data on a Traffic Channel 12 or an Access Channel 14 depending on the packet size. The message is sent using airlink 16 to a base station controller 18. Depending on the message it can then be sent to the packet data serving node 20 from which it can access the Internet 22 or a variety of devices 24, as is known to those skilled in the art.

Figure 2:
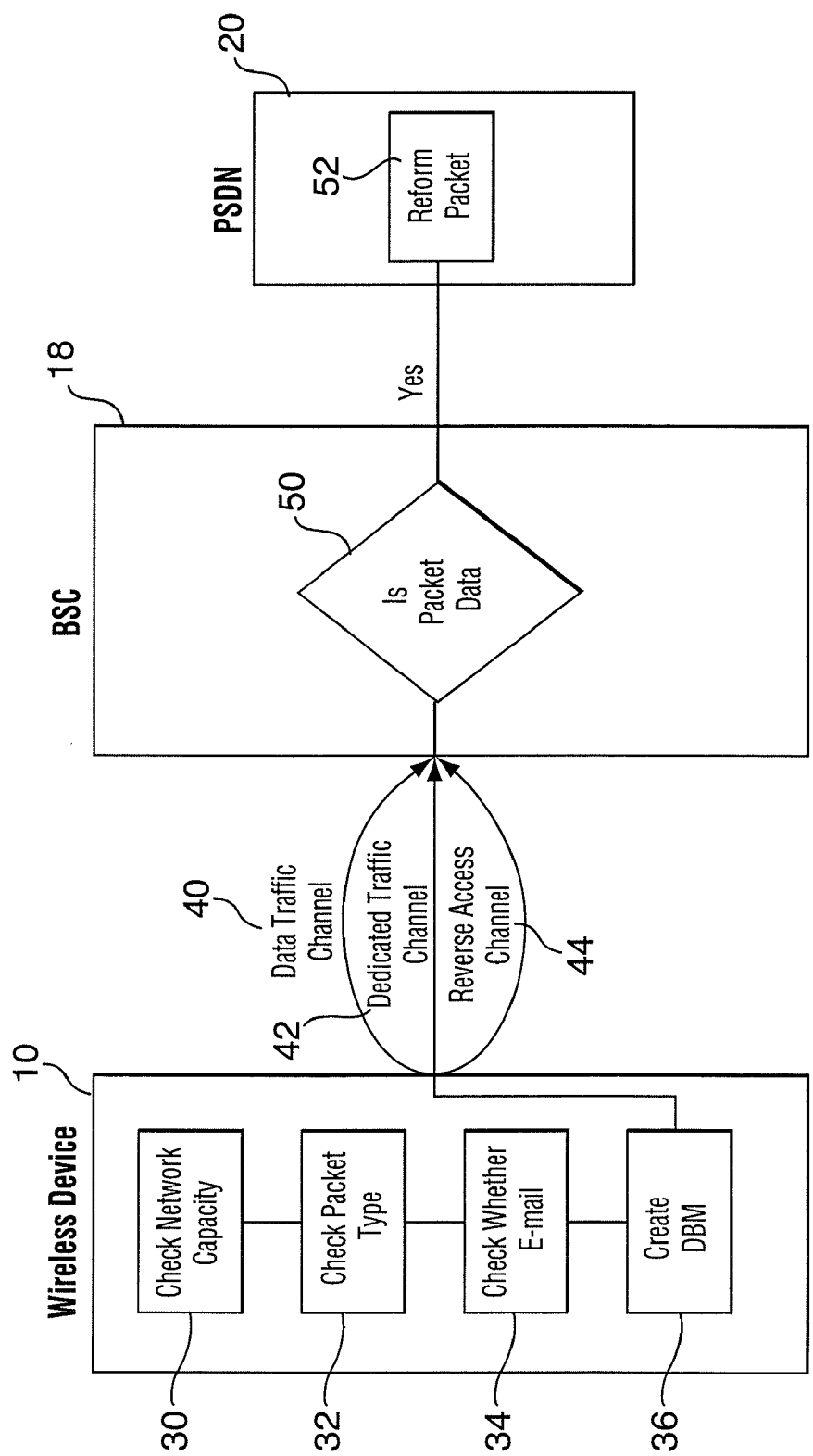
FIG. 2 is a flow chart of the steps involved in passing a message along the reverse link.

Reference is now made to FIG. 2. In the wireless device 10, an application layer is notified of the serving CMDA 2000 systems access channel and voice Traffic Channel maximum transport capabilities. Before Packet Data is sent the application layer in step 30 checks the network transport capability and in step 32 looks at the packet type in order to decide the packet transport mode. The application layer further checks to see whether the message is an e-mail packet or not in step 34. If it is an e-mail packet the destination e-mail address is included in the Packet Data.

The application layer, in step 36, next creates a Data Burst Message (DMB) if Data Burst Messages are to be used for transmission. The burst type in the DBM is indicated as Packet Data and includes information about whether the packet is an e-mail message The Data Burst Message can then be sent to the base station controller 18 using data Traffic Channel 40, dedicated Traffic Channel 42 or reverse Access Channel 44 as is explained in more detail below.

Once the base station controller 18 receives a Data Burst Message on the reverse link, the base station controller checks the burst type in step 50 and if the burst type is Packet Data, the base station controller forwards the Data Burst Message to the packet data serving node (PDSN) 20. The PDSN 20 decapsulates the Data Burst Message and reforms the packet to transport over the Internet 22 in step 52. The PDSN further keeps the originating device's e-mail address and the international mobile station identity (IMSI) mapping table. If the Data Burst Message is an e-mail packet, both the originating and destination e-mail addresses are included in the packet.

As one skilled in the art will realize, the upper layer of a device should implement a retransmission scheme to recover any data packet loss in the airlink. When using Data Burst Messages, the Radio Link Protocol (RLP) is not used, and thus packet loss is possible.

Figure 3:
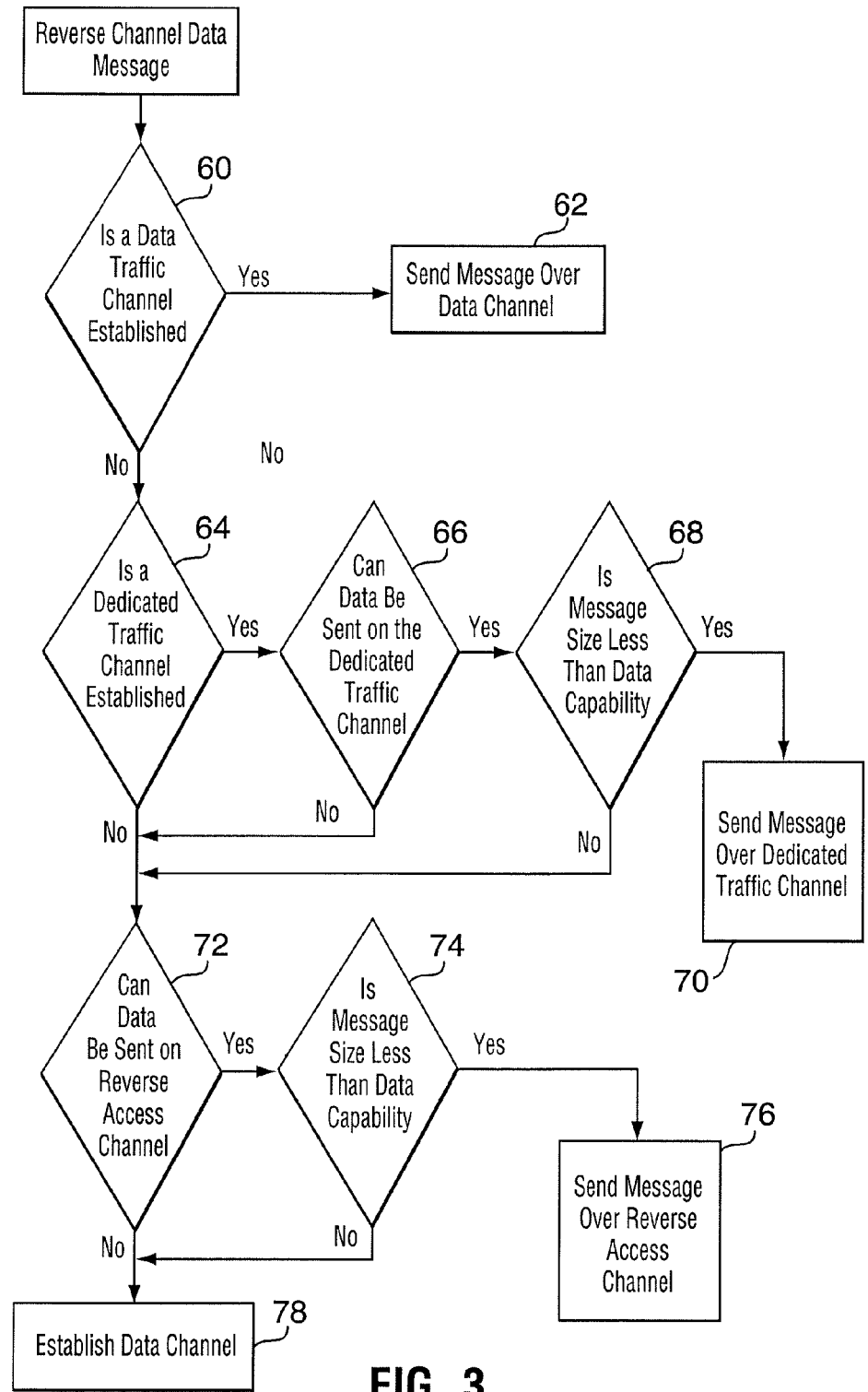
FIG. 3 is a decision tree for determining which channel will be used to pass the message.

Reference is now made to FIG. 3. Before sending Packet Data the application layer on the wireless data device 10 decides the packet transfer mode based upon the network capacity and the packet type.

Upon transmission to the radio link, the device Packet Data state is also checked. In step 60, the application layer checks to see whether a data Traffic Channel is already established. If a data Traffic Channel is already established then a message is always sent in step 62 over the dedicated data Traffic Channel.

If, however, no data Traffic Channel was found to be established in step 60 the application layer moves to step 64. In step 64, the application layer checks whether a dedicated Traffic Channel is established. Such a dedicated Traffic Channel can, include a voice traffic channel, but it is not indented to limit the present invention to a voice traffic channel, and any dedicated Traffic Channel could be used.

If a dedicated Traffic Channel is established, the application layer next moves to step 66 in which it checks whether data can be sent on the dedicated channel. If data can be sent on the dedicated channel the application layer moves to step 68 in which the message size is checked to determine whether it is less than the data capability of the dedicated Traffic Channel. If in step 68 it is determined that the message size is less than the data capability then the message is sent over the dedicated Traffic Channel in step 70.

Conversely, if no dedicated Traffic Channel has been established, if data cannot be sent over the dedicated channel, or if the message size is greater than the data capability of the dedicated Traffic Channel, as determined in steps 64, 66 and 68 respectively, the application layer next moves to step 72

In step 72, the application layer determines whether data can be sent on the reverse access channel. If data can be sent on the reverse access channel, the application layer moves to step 74 in which it checks whether the message size is less than the data capability of the reverse access channel. If the message size is less than the data capability of the reverse access channel, then the message is sent over the reverse access channel in step 76.

If data cannot be sent over the reverse access channel or if the message size is greater than the data capability of the reverse access channel, as determined in step 72 and 74, then the wireless data device establishes a dedicated data Traffic Channel in step 78 and messages are then sent over the dedicated data Traffic Channel.

One skilled in the art will realize that other methods can be used for determining which channel to send the data packets on. This could include using the reverse Access Channel as a preferred channel over the dedicated Traffic Channel. It could further include only checking either the reverse access channel or the dedicated traffic channel, and establishing a data Traffic Channel if that one channel is unavailable to be used. Other possibilities will be apparent to one skilled in the art.

Figure 4:
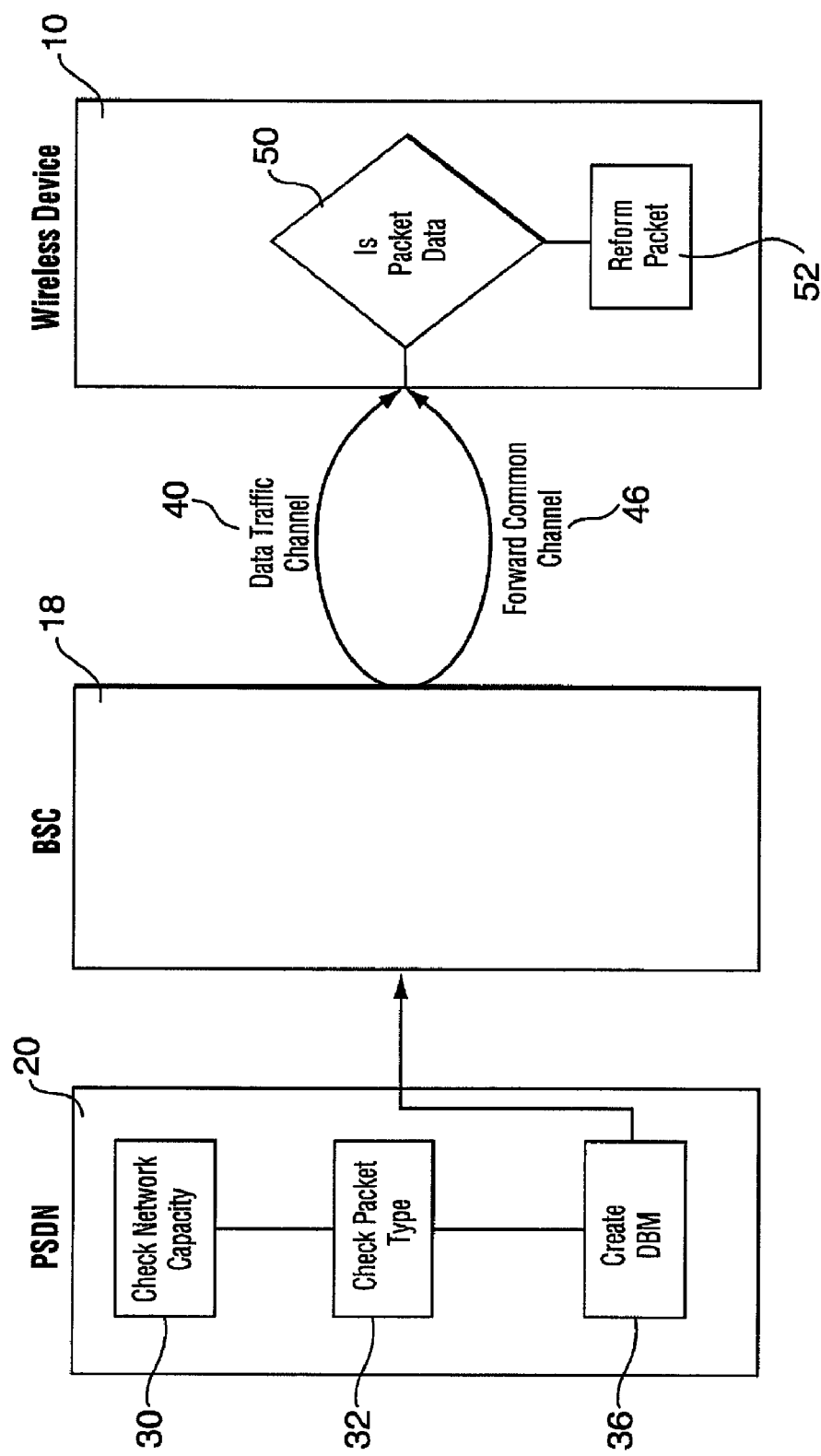
FIG. 4 is a flow chart of the steps involved in passing a message along the forward link.

Reference is now made to FIG. 4. When PDSN 20 receives a data packet, an application layer is notified of the serving CMDA 2000 system's forward common channel maximum transport capability. Before Packet Data is sent the application layer in step 30 checks the network transport capability and in step 32 looks at the packet type in order to decide the packet transport mode.

The application layer, in step 36, next creates a Data Burst Message (DMB) if Data Burst Messages are to be used for transmission. The burst type in the DBM is indicated as Packet Data.

The Data Burst Message can then be sent through base station controller 18 and to the wireless device 10 using data Traffic Channel 40 or the forward common channel 46 similarly to the method described above for the reverse access channel.

Once the wireless device 10 receives a Data Burst Message on the forward link, the wireless device checks the burst type in step 50 and if the burst type is Packet Data, the wireless device removes the Data Burst header in step 52 and passes the packet to its application layer.

As with the reverse link, one skilled in the art will realize that the upper layer of the PDSN device should implement a retransmission scheme to recover any data packet loss in the airlink because RLP is not used.

The present invention overcomes the disadvantages of the prior art by providing a way to send data traffic without having to establish a dedicated data Traffic Channel. This saves both network resources by not having a dedicated data Traffic Channel and by not requiring the messages needed for the establishment of the dedicated data Traffic Channel. The present invention further saves the battery life of the wireless data device by not requiring the additional messages for establishing a dedicated data Traffic Channel.

The above-described embodiments of the present invention are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims depended hereto.

The invention claimed is:

1. A method for saving network resources in a CDMA2000 network, the method comprising the steps of:
   receiving a data packet for a wireless data device at a base station controller in the CDMA2000 network;
   determining a frame transport capability of a forward common channel;
   checking whether the data packet falls within said frame transport capability; and
   if said data packet falls within said frame transport capability,
   encapsulating said data packet as a data burst message; and
   sending said data burst message over said forward common channel,
   wherein said sending step over said forward common channel precludes a dedicated data traffic channel being established for said data packet thereby saving network resources on said CDMA2000 network.

2. The method of claim 1, further comprising the step of determining a packet transport mode based on a packet type of the data packet.

3. The method of claim 1, wherein said encapsulating step further adds an email address to said data burst message if said data packet is email.

4. The method of claim 1, wherein the wireless data device reforms said data burst message.

5. The method of claim 1, wherein a burst type of the data burst message is indicated as packet data.

6. The method of claim 1, wherein the sending step is performed through a base station controller to the wireless data device using the forward common channel.

7. The method of claim 1, further comprising the step of utilizing a data traffic channel instead of the forward common channel if the data traffic channel is established.

8. A packet data serving node adapted to save network resources in a CDMA2000 network, comprising:
   a communications subsystem adapted to receive a data packet;
   a processor adapted to:
   determine a frame transport capability of a forward common channel,
   check whether the data packet falls within said frame transport capability; and
   if said data packet falls within said frame transport capability,
   encapsulate said data packet as a data burst message; and
   send, utilizing said communications subsystem, said data burst message over said forward common channel,
   wherein the sending the data burst message over said forward common channel precludes a dedicated data traffic channel being established for said data packet thereby saving network resources on said CDMA2000 network.

9. The packet data serving node of claim 8, wherein the processor is further adapted to determine a packet transport mode based on a packet type of the data packet.

10. The packet data serving node of claim 8, wherein the processor is adapted to add an email address to said data burst message if said data packet is email.

11. The packet data serving node of claim 8, wherein a burst type of the data burst message is indicated as packet data.

12. The packet data serving node of claim 8, wherein the communications subsystem is adapted to send the data burst message through a base station controller to a wireless data device using the forward common channel.

13. The packet data serving node of claim 8, wherein the communications subsystem is adapted to utilize a data traffic channel instead of the forward common channel if the data traffic channel is established.

* * * * *